(12) United States Patent
Vertes et al.

(10) Patent No.: US 7,725,763 B2
(45) Date of Patent: May 25, 2010

(54) FUNCTIONAL CONTINUITY BY REPLICATING A SOFTWARE APPLICATION IN A MULTI-COMPUTER ARCHITECTURE

(75) Inventors: Marc Vertes, Saint Lys (FR); Laurent Dufour, Plaisance du Touch (FR); Francois Richard, Lacroix Falgarde (FR); Gregory Kurz, Tournefeuille (FR)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 10/522,897

(22) PCT Filed: Jul. 28, 2003

(86) PCT No.: PCT/FR03/02371

§ 371 (c)(1),
(2), (4) Date: Feb. 1, 2005

(87) PCT Pub. No.: WO2004/015574

PCT Pub. Date: Feb. 19, 2004

(65) Prior Publication Data

US 2005/0251785 A1  Nov. 10, 2005

(30) Foreign Application Priority Data

Aug. 2, 2002 (FR) .................................. 02 09855

(51) Int. Cl.
*G06F 11/00* (2006.01)
(52) U.S. Cl. ........................................................ 714/6
(58) Field of Classification Search ...................... 714/6
See application file for complete search history.

(56) References Cited

U.S. PATENT DOCUMENTS

| | | | | |
|---|---|---|---|---|
| 5,852,724 A | * | 12/1998 | Glenn et al. | 709/239 |
| 6,014,686 A | * | 1/2000 | Elnozahy et al. | 709/202 |
| 6,363,416 B1 | * | 3/2002 | Naeimi et al. | 709/209 |
| 6,438,705 B1 | * | 8/2002 | Chao et al. | 714/4 |
| 7,058,846 B1 | * | 6/2006 | Kelkar et al. | 714/4 |
| 7,093,013 B1 | * | 8/2006 | Hornok et al. | 709/224 |

(Continued)

OTHER PUBLICATIONS

Kam Hong Shum: "Fault tolerant cluster computing through replication" Parallel and Distributed 1997, Proceedings. 1997 International Conference on Seoul, South Korea Dec. 10-13, 1997, Los Alamitos, CA, USA, IEEE Comput. Soc, US, Dec. 10, 1997, pp. 756-761, XP010267110 ISBN: 0-8186-8227-2 p. 756, left-hand column, paragraph 3, right-hand column, paragraph 2.

(Continued)

*Primary Examiner*—Robert Beausoilel
*Assistant Examiner*—Amine Riad
(74) *Attorney, Agent, or Firm*—Matthew W. Baca; Amy J. Pattillo (57) ABSTRACT

Disclosed is a method for replicating a software application in a multi-computer architecture (cluster). The software application is executed on a first computer of the cluster, which represents a primary or operation node, and is replicated on at least one other computer of the cluster, which represents a secondary node, including replication of the resources associated with the software application. The method includes streamlined updating of the replicated resources via a dynamic introspection mechanism supplying the structure of the application that is to be replicated and the dynamic graph of the implemented resources and dependencies.

18 Claims, 7 Drawing Sheets

U.S. PATENT DOCUMENTS

| | | | | |
|---|---|---|---|---|
| 7,305,578 B2* | 12/2007 | Baba et al. | ............ | 714/6 |
| 2001/0008019 A1* | 7/2001 | Vert et al. | ............ | 714/1 |
| 2003/0005356 A1* | 1/2003 | Franckowiak et al. | ......... | 714/11 |
| 2004/0034808 A1* | 2/2004 | Day et al. | ............ | 714/6 |
| 2006/0294323 A1* | 12/2006 | Armstrong et al. | .......... | 711/153 |
| 2007/0180436 A1* | 8/2007 | Travostino et al. | .......... | 717/138 |

OTHER PUBLICATIONS

Vaysburd A: "Fault tolerance in three-tier applications: focusing on the database tier" Reliable Distributed Systems, 1999. Proceedings of the 18$^{TH}$ IEEE Symposium on Lausanne, Switzerland Oct. 19-22, 1999, Los Alamitos, CA, USA, IEEE Comput. Soc, US, Oct. 19, 1999, pp. 322-327, XP010357037 ISBN: 0-7695-0290-3 p. 323, right hand column, paragraph 2-paragraph 3.

Murakami K et al: "Design Implementation, and evaluation of hightly availabe distribured call processing system" Fault-Tolerant Computing, 1998. Digest of Paters. Twenty-Eighth Annual International Symposium on Munich, Germany Jun. 23-25, 1998, Los Alamitos, CA, USA, IEEE Comput. Soc, US, Jun. 23, 1998, pp. 118-127, XP010291284 ISNB: 0-8186-8470-4 p. 118, right-hand column, paragraph 2.

Bin Yao et al: "Proxy-based recovery for applications on wireless hand-held devices" Reliable Distributed Systems, 2000. SRDS-2000. Proceedings the 19$^{TH}$ IEEE Symposium on Nurnberg, Germany Oct. 16-18, 2000, Los Alamitos, CA, USA, IEEE Comput. Soc, US, Oct. 16, 2000, pp. 2-10, XP010523941 ISBN: 0-7695-0543-O the wole document.

* cited by examiner

FUNCTIONAL CONTINUITY BY REPLICATING A SOFTWARE APPLICATION IN A MULTI-COMPUTER ARCHITECTURE

The present invention concerns a method for replicating a software application in a multi-computer architecture (cluster). It also relates to a method ensuring functional continuity of a software application within a computer cluster, thereby implementing the replication method according to the invention, as well as to a multi-computer system implementing said functional continuity method.

The field of the invention is that of the computer clusters composed of several computers co-operating with one another. Such clusters are for example provided for executing software applications. Thus, at a given time, an application is run on one of the computers of the cluster, called primary or operational node (OP), while the other computers of the cluster are called secondary or "stand-by" (SB) nodes, in a redundant architecture context.

Still, the operation of such clusters shows that reliability problems arise, which may be due to faults in the hardware of the operating system, to human errors or to faults in the applications properly speaking.

To solve these reliability problems, there are currently so-called high-availability mechanisms, which are implemented in most of the current clusters and which are based upon a cold re-start of the application on a back-up node among one of the secondary nodes of the cluster.

Still, these mechanisms based upon automatic re-start do not guarantee total continuity of the services provided by the application in progress at the time of the fault.

In particular, there is the problem of replication of a software application within a multi-computer architecture, whereas said replication should ensure total service continuity.

A main purpose of the present invention is therefore to provide a method for replicating a software application in a multi-computer architecture (cluster), whereas said software application may be executed beforehand on a first computer of said cluster forming a primary node and intended for replication on at least one other computer of said cluster forming a secondary node, comprising a replication of the resources associated with said software application.

This main objective is met with such a replication method characterised in that it includes streamlined or on the flow updating of the resources replicated by a dynamic introspection mechanism supplying the structure of the application to be replicated, as well as the dynamic graph of the resources and dependencies worked on.

Advantageously, such replication method may comprise moreover the creation and the maintenance of a dependency tree, supplying at all times information on the resources which ought to be replicated.

It should be noted that in the replication method according to the invention, the number of secondary or stand-by nodes affected is irrelevant.

In a preferred embodiment of the invention, the replication method according to the invention includes moreover a so-called checkpointing mechanism via which the resources to be replicated are indeed replicated on one or several secondary nodes.

The replication method according to the invention may advantageously include the three following steps:
- capturing resources on the primary node,
- transfer over the network towards one or several secondary nodes,
- restoration on the secondary node(s).

The replication method according to the invention may be advantageously implemented for automatic optimisation of information resources by load sharing through dynamic process distribution. It may also be used for non-interruptive maintenance by process re-location upon request, over data-processing resource network, or for preservation of applicative context in mobile applications.

Another object of the present invention is to provide a method ensuring functional continuity of a software application in a multi-computer architecture (cluster), whereas said application is run at a given time on one of the computers of the cluster, so-called main or operational node, whereas the other computers of said cluster are called secondary nodes.

This other objective is met by a method ensuring functional continuity in continuity of a software application in a multi-computer architecture (cluster), whereas said application is run at a given time on one of the computers of the cluster, so-called main node, whereas the other computers of said cluster are called secondary nodes.

According to the invention, the method includes the following steps:
- replication of the application on at least one of the secondary nodes, in order to provide at least one clone of said application,
- on the flow updating of said clone(s), and
- when detecting a fault or an event affecting said main node, switching the service towards one at least of said clones.

Thus, with the method ensuring functional continuity according to the invention, it is possible as of now to have several secondary nodes available, fitted with application clones resulting from the replication of the application and capable of relaying continuously said application in case when a fault or an event affecting the main node is detected.

The replication implemented in the replication method according to the invention is advantageously of holistic type. The application is then cloned in a on the flow fashion, with determinist and complete updating of said clones.

Such clones are said to be "hot", i.e. they are the perfect replica of the application and of its entire operating context. They are updated regularly (periodically or in case of characteristic events). These clones include all the resources and information required by the application to provide an appropriate service.

The replication method according to the invention enables moreover to supervise the state of all the resources necessary to correct operation of the application. If one of them is detected as irreversibly damaged, the replication method according to the invention provides the election of a clone as a new primary and instructs it to take over.

This election is called switching and is transparent for the rest of the world which communicates with the application: although the primary node is put out of service, the service provided by the application is not interrupted since it has been taken over with its entire context by the clone elected.

It may be thus guaranteed that any message transmitted by the rest of the world to the application will be processed, either by the primary node (pre-switch) or by the clone (post-switch). To do so, the replication method according to the invention may also comprise a record on each clone (on top of the periodic cloning mechanism) of all the messages received by the primary since the last update of the clones. These messages will be re-injected into the clone elected as new primary when switching.

Holistic replication takes up mechanisms already implemented in existing method migration systems. However, the design and the use made thereof in the replication method according to the invention differ from all the previous works known.

The method ensuring functional continuity according to the invention implements a transparent, holistic and optimised replication, dedicated to the service continuity by de-location of the application and virtualisation of the resources.

With this method, several limitations of the conventional implementations may be overcome, limitations which made them ineffective when used for fault tolerance within a cluster-type multi-computer architecture.

A first limitation lied in the problem of independence between primary node and secondary node. In the conventional systems, the replication of a resource from a primary node to a secondary node assumes and requires the operational presence of the primary node throughout the process. The replication method according to the invention overcomes this limitation since the clone may at any time live on as a stand-alone unit, even if the primary node disappears. Such primary/secondary de-correlation is a prerequisite for fault tolerance.

As the replication implemented in the replication method according to the invention is holistic, the whole coherence of interdependent asynchronous resources is captured. In the methods of the previous art, only the states of independent resources were captured.

Another limitation of the methods of the previous art resided in the problem of intrusiveness. The replication method according to the invention in non-intrusive on the source code: the previous ways require to modify the source code (or to design it explicitly) so that the computer processes created and the resources used can be migrated.

It should be noted that for the implementation of the replication method according to the invention, dynamic non-intrusive software engineering techniques may be used advantageously, techniques mentioned in a patent application published on 2 Aug. 2002 under the number FR2820221. These software engineering techniques enable to handle applications in their binary (executable) representation, in order to render the method ensuring functional continuity according to the invention transparent for the application, and therefore generic.

According to another aspect of the invention, there is provided a multi-computer system for executing on at least one of the computers at least one software application, implementing the method ensuring functional continuity according to the invention.

Other advantages and features of the invention will appear in conjunction with the detailed description of an embodiment, without being limited thereto, and the appended drawings whereon.

We shall now describe, with reference to the figures aforementioned, the operation of the holistic replication mechanism implemented in the replication method according to the invention.

For the application to run correctly on a secondary node after switching, all the resources required by said application should also be replicated on the secondary node.

If such resources are state-type resources, i.e. they vary as the application progresses and are part of the global context thereof, then their state should also be captured and replicated in a coherent way.

All such resources are discovered when initialising the application, and then are kept updated on the flow by dynamic introspection mechanisms which enable to supply automatically the structure of the application to be protected, as well as the dynamic graph of the resources and dependencies worked on.

These mechanisms are based upon the reflexive characteristics of the binary elements, on the inheritance mechanisms of the operating systems and on the surveillance, via binary instrumentation, of the mechanisms (including system calls) which contribute to change the state of its resources.

Figure 4:
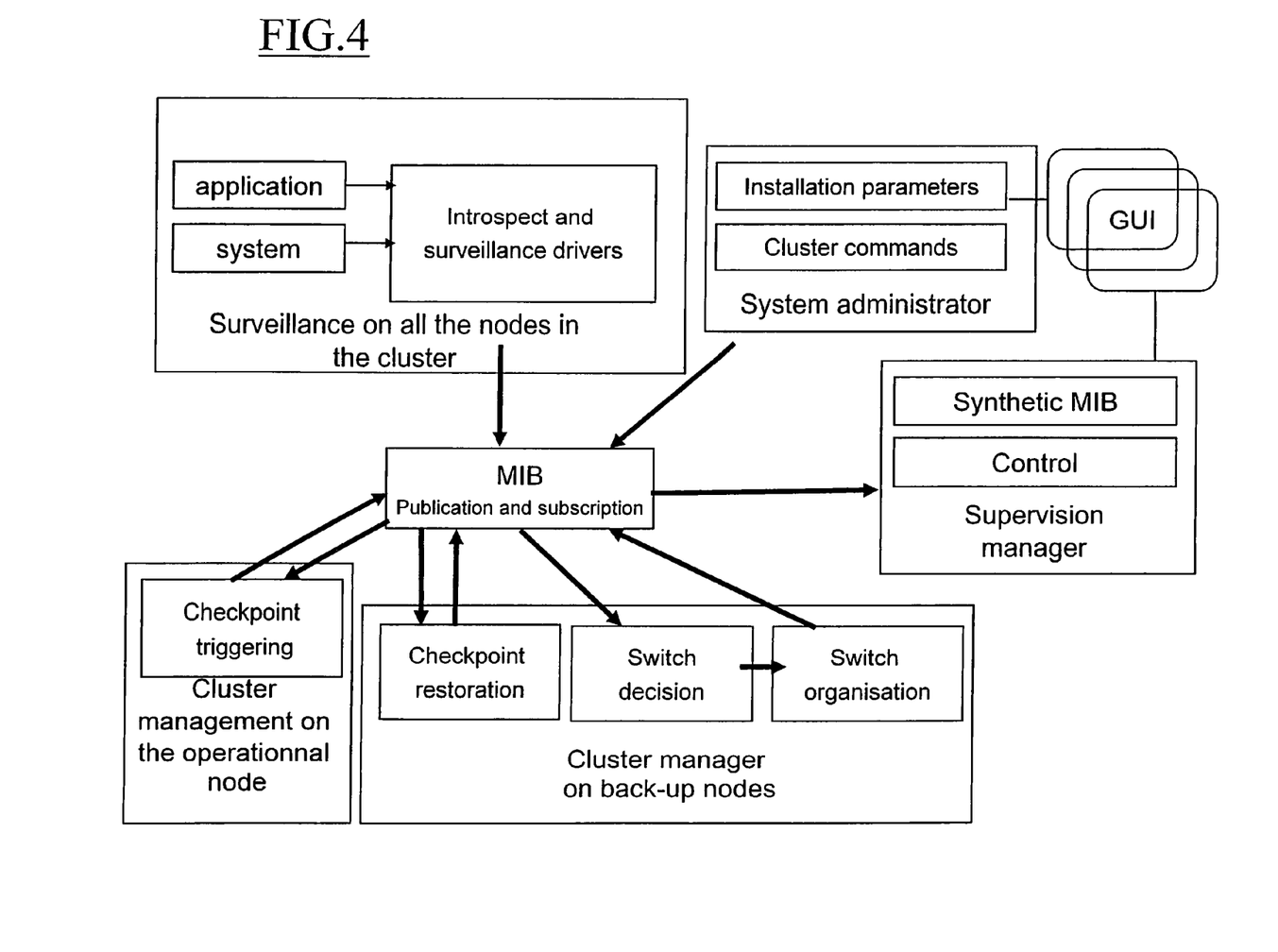
FIG. 4 illustrates diagrammatically supervision principles implemented in the replication method according to the invention.

With reference to FIG. 4, in an embodiment of the replication method according to the invention, introspection and surveillance drivers will supervise all the nodes of the cluster and transmit surveillance data to the MIB management database of the system. This MIB database is involved both in the management of the cluster on the operational node for triggering checkpoints and in the management of the cluster on back-up nodes. The MIB database is also called upon by supervision manager with a synthetic MIB database and is accessed by the system administrator to whom graphic user interfaces (GUI) are associated.

The result of this discovery and on the flow introspection work is the creation and the maintenance of a "dependency tree", supplying to the replication method according to the invention, at any time, information on the resources that ought to be replicated. The existence of such graph ensures completeness and consistency of the clones.

Another checkpointing mechanism, implemented in the method ensuring functional continuity according to the invention, consists in replicating the resources on one or several secondary nodes. This resource replication mechanism is composed of three steps:

capturing resources on the primary node,
transferring via the network towards one or several secondary nodes, and
restoration on the secondary node(s).

The replicated resources include:

the virtual memory of each process affected as well as its calling stack,
system resources (inter-process communication, network connection, etc.) and
data written on disks.

The resource replication mechanism ensures that all the resources necessary to the application is transferred completely and consistent (hence holistic).

The implementation of the replication method according to the invention guarantees that the application may continue on the secondary without loosing its context: the application is de-localised, the underlying hardware and the operating system are virtualised, whereas the application behaving independently of its physical localisation.

When switching, the application is considered as stopped: it runs on in its own context, but on other hardware resources.

The resources worked on by the application are diverse and varied (multi-process, operating system, etc.). They live asynchronously, on a non-determinist environment.

The replication method according to the invention implements an asynchronous checkpointing algorithm: a synchronisation barrier is transmitted to all the resources and the replication method according to the invention guarantees that the state capture is complete and consistent.

We shall now describe an optimisation technique implemented in the replication method according to the invention. The determinist and complete capture of the state of all the resources is costly to the performances of the system. Still, small impact on the performances of the application is a prerequisite for market acceptability of the product and hence, in fine, for its use. Several optimisation techniques have therefore been designed and developed in order to minimise such impact.

Firstly, the quasi-synchronous checkpoint is an optimisation of the conventional checkpointing mechanisms: it provides consistent capture of the synchronous algorithms, without involving total stoppage of the system during capture, as required by the asynchronous algorithms.

The checkpointing period is adjustable, in order to optimise the compromise between the recovery time after switching (potentially even longer proportionally to the period between two checkpoints) and the quantity of state information to be captured and transferred.

Figure 1:
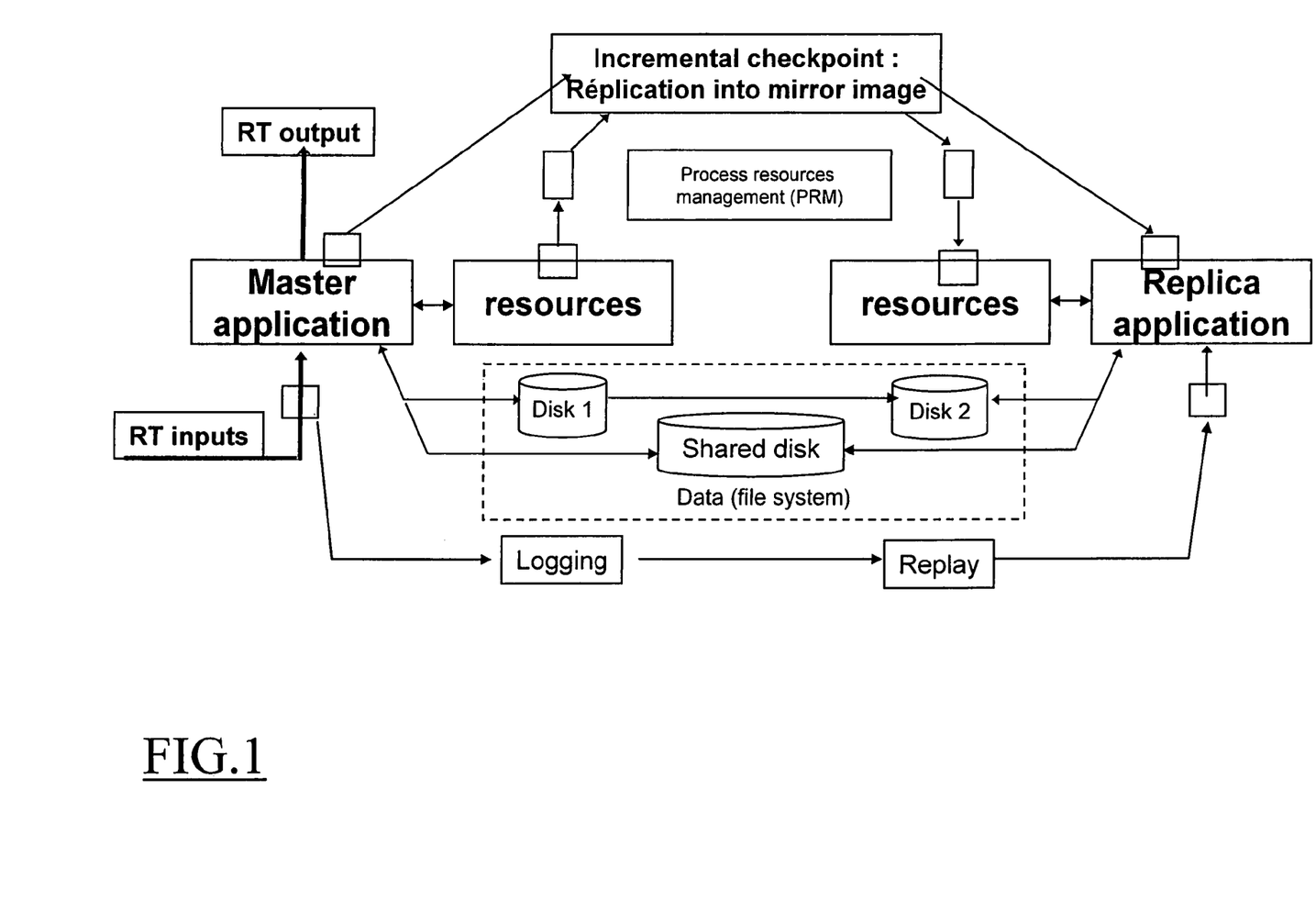
FIG. 1 illustrates the dynamic mirror function implemented in the replication method according to the invention.

Besides, the checkpoint is incremental: only the state differences between two checkpoints are transmitted, as illustrated on the functional example of FIG. 1. In this example, an incremental checkpoint is carried out from the master application to supply the replicated application and a disk shared between both primary and secondary nodes is implemented.

First, the first checkpoint is costly as regards performances (initialisation pf the clones), but the following ones have little impact.

The checkpoint is also discriminating: the intelligent analysis of the dependency graph enables to limit to the strict minimum the quantity of information to be transmitted.

Figure 5:
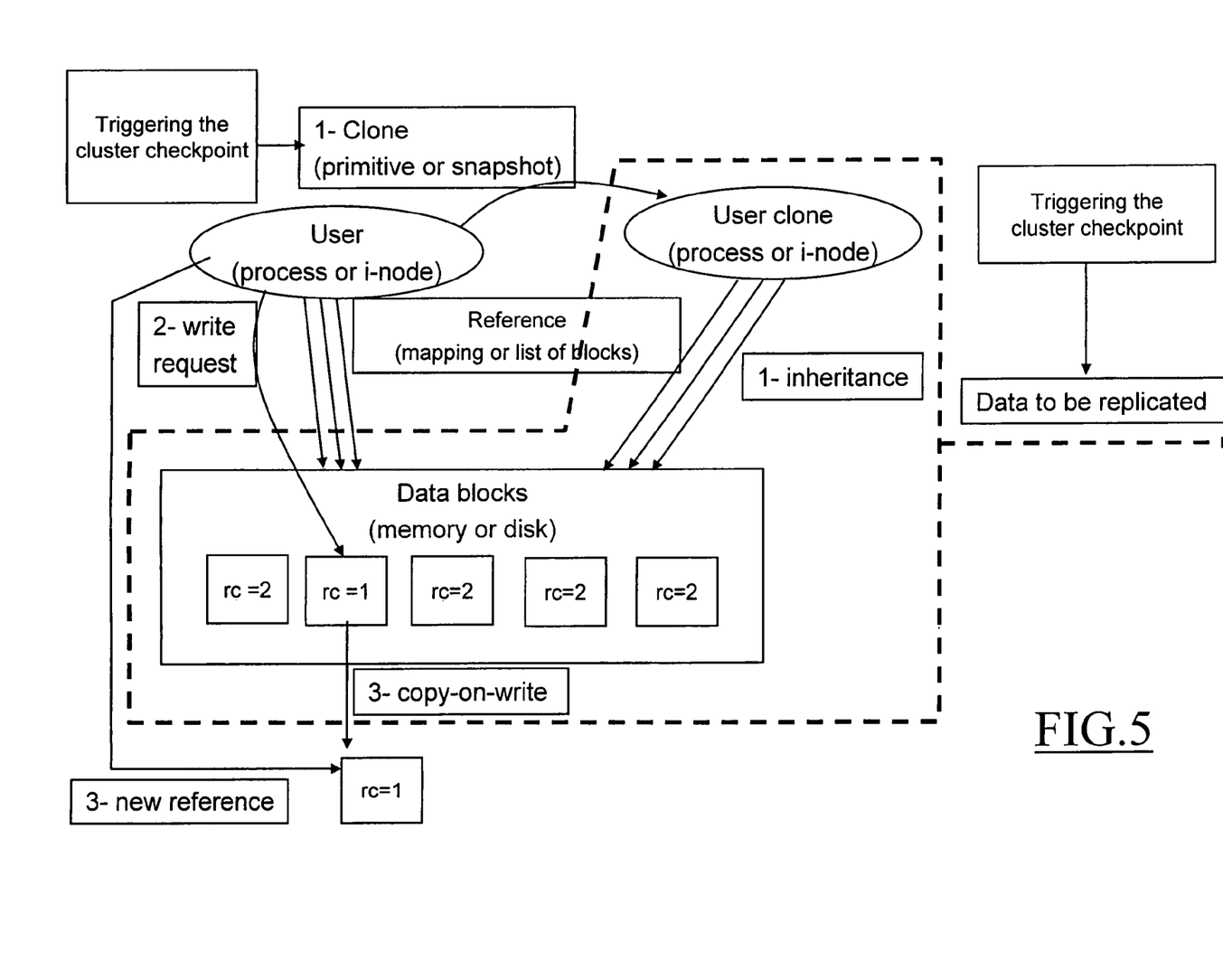
FIG. 5 illustrates diagrammatically the copy-on-write mechanism, implemented in the replication method according to the invention.
Figure 6:
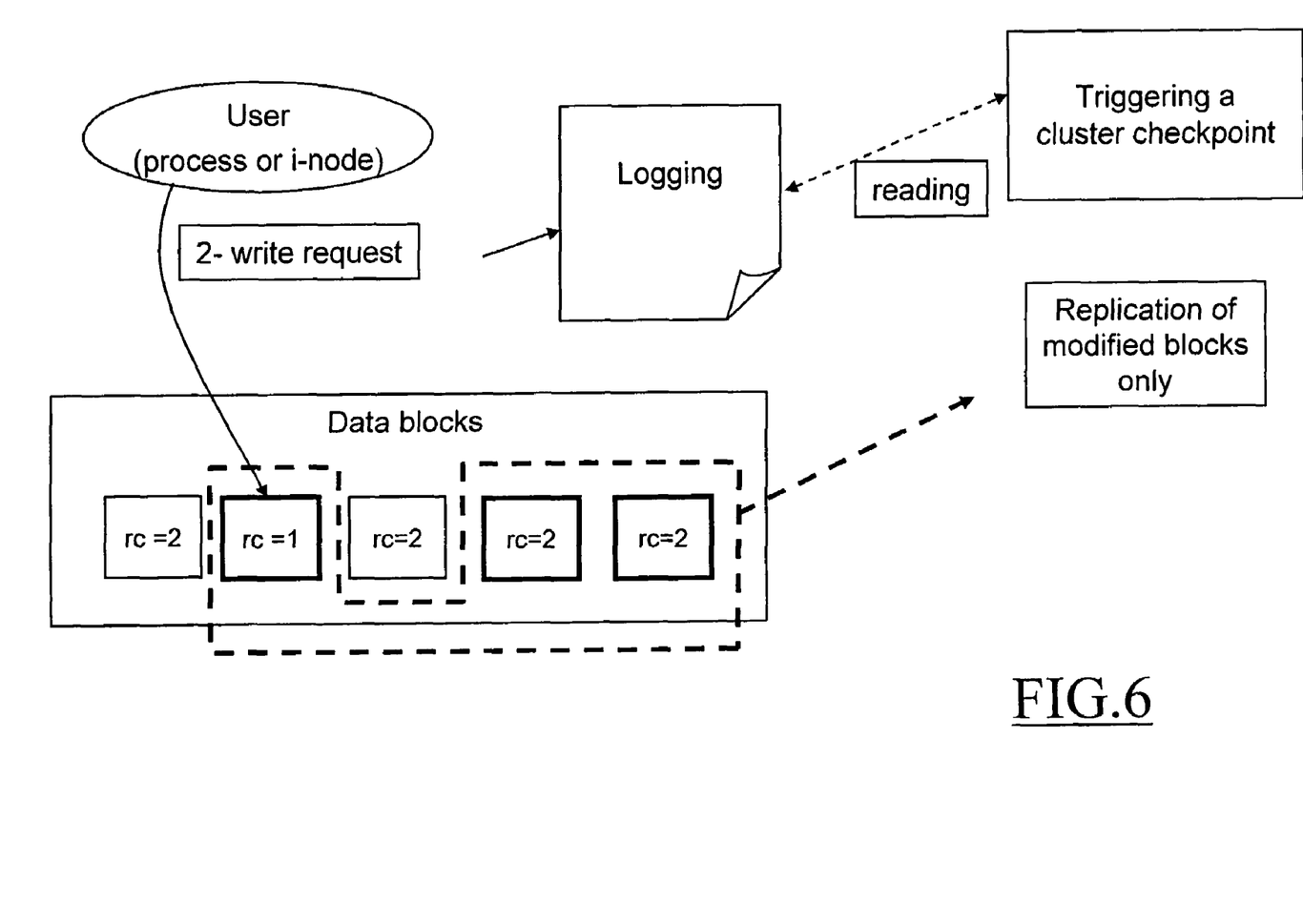
FIG. 6 illustrates diagrammatically the incrementation mechanism for replication implemented in the replication method according to the invention.

Finally, copy-on-write mechanisms provided by the operating system are implemented to separate the time of capture from the time of transfer, with reference to FIG. 5, which illustrates an example of implementation of a copy-on-write mechanism in a replication method according to the invention, after triggering a checkpoint. In that example, the copy-on-write mechanism takes place on data blocks (memory or disk) for a new reference, after a request-to-write issued from a User via a process or an i-node (index node). Only the modified data blocks are replicated, as illustrated on FIG. 6.

We shall now describe an example of implementation of the quasi-synchronous checkpointing mechanism within a method ensuring functional continuity according to the invention. Said mechanism includes:
 a process synchronisation barrier (PSB),
 a resource management (RM),
 a system resources management (SRM), and
 a process resources management (PRM).

The process synchronisation barrier (PSB) is a mechanism enabling to synchronise the locking of the processes forming an application while respecting the management of the inputs/outputs in progress, in order to be able to take at a T-time a non-blurred "photograph" of the state of the system and of the application.

The resource management (RM) is a set of generic automata enabling to implement the sequencing of the different checkpointing phases as regards the various resources necessary to replicate an application from one machine to another.

The system resources management (SRM) includes mechanisms enabling to manage the different system resources management routines used by an application (set of processes) during the different phases of the checkpointing mechanism.

The process resources management (PRM) includes mechanisms enabling to manage the different resources management routines used by a process during the different phases of the checkpointing mechanism. Such code is loaded dynamically inside the applicative processes as they are launched.

There are today three main phases which are themselves divided into different phases necessary for capturing the resources used by the application.

The purpose of these different sub-phases is to minimise the applicative stoppage times associated with the recovery/restoration of the different applicative and system resources as well as to guarantee the consistency within the information saved.
 DUMP:
 RM_PRE_DUMP
 RM_DUMP
 RM_POST_DUMP
 RM_ABORT_DUMP
 RESTORE
 RM_PRE_RESTORE
 RM_RESTORE
 RM_POST_RESTORE
 RM_ABORT_RESTORE
 SWITCH:
 RM_PRE_SWITCH
 RM_SWITCH
 RM_POST_SWITCH
 RM_ABORT_SWITCH We shall now describe a virtualisation of the system resources within the framework of the replication method according to the invention. Certain UNIX system resources are characterised by a single identifier, unique to each machine. Such identifiers are stored in the form of variables by the applications, which enables the latter to reference the former. During the migration of an application from one machine to another, the memory of the applications is transferred integrally, including the data relative to the system resources. To be able to guarantee the uniqueness of the referencing process of the system resources an application META-CLUSTER implements mechanisms virtualising such resources, enabling to maintain unique identifiers between the different machines forming a CLUSTER.

Such virtualisation machines are today applied for the following system resources identifiers:
 Process
 PIPE
 FIFO
 IPC System V
  Shared memories
  Semaphores
  Messaging queues
 AF UNIX socket
 Threads The virtualisation mechanisms ensure therefore the uniqueness of the referencing process of a system resource within the cluster as well as its translation towards a system resource on each machine. They are implemented in the form of dynamic kernel modules ensuring the requests made thereto to be non-preemptive, on mono- and multi-processor systems, and with a capacity to introspect the different routines enabling to handle such identifiers.

By way of non-limiting example, a routine getpid is instrumented by META when the application is taken over by META-CLUSTER and its use by the application returns a CLUSTER_PID which may then be used by the application with any routine adopting a PID as parameters (kill, waitpid, ... ).

Figure 2:
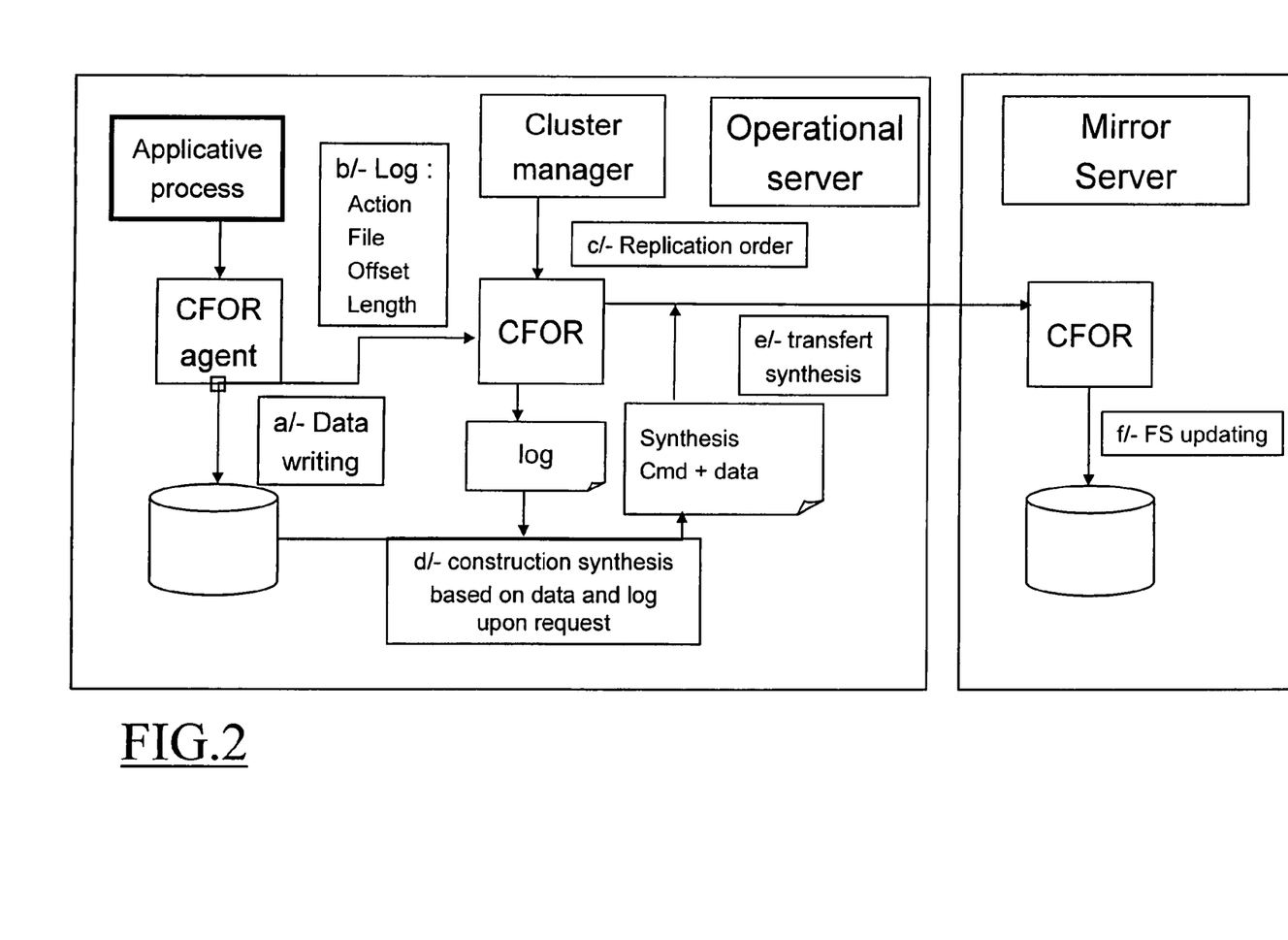
FIG. 2 illustrates diagrammatically the principles of data replication implemented in the replication method according to the invention.
Figure 3:
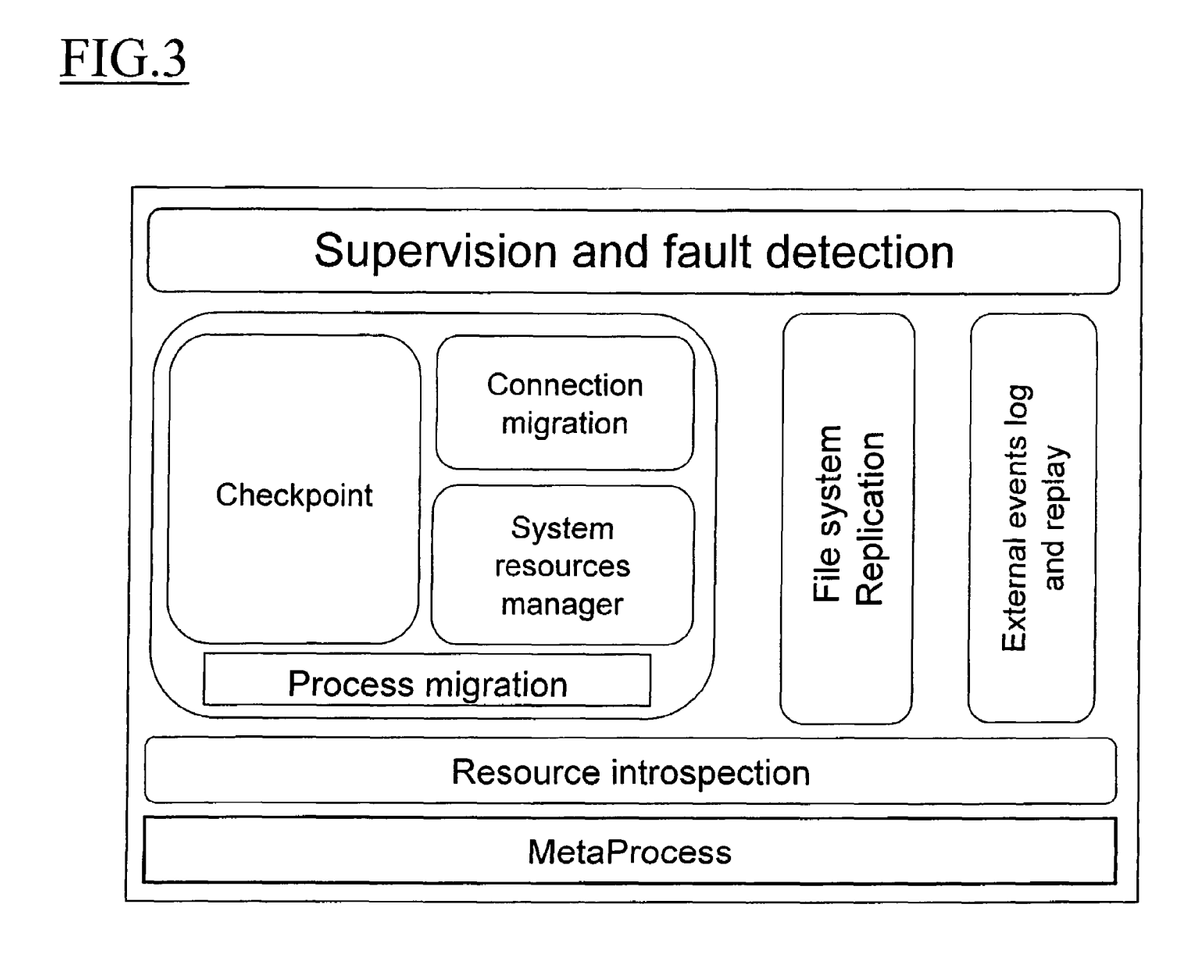
FIG. 3 represents an example of software architecture implementing the replication method according to the invention, for the supervision and detection of faults.

The replication method according to the invention also includes a module for replicating applicative data files between the operational node and the stand-by node, designated as CFOR (Cluster File system Optimised Replication) with reference to FIG. 2.

The CFOR module fulfils therefore the following functions:
a) writing data
b) modifying the log
c) order of replication
d) data-based synthesis
e) transfer synthesis
f) updating the file system (FS).

This replication module operates as follows: between each copy (dump), CFOR builds on the fly a cumulative and synthetic log of the modifications made to the file system by the cluster-controlled applications.

The modifications made to the file system are extracted on the fly by instrumentation, in the applicative processes, of the various system calls: write(2), mkdir(2), rmdir(2), unlink(2) .... The principle consists in memorising only the actions without the data. Thus, if an application writes 2 Mb in a file, only the action "file, writing, start, end" is memorised, whereas the 2 Mb-data have been saved by the operating system on the disk, it is not necessary to duplicate them somewhere else.

The multiples writing sequences are synthesised on the flow. If an application performs the following actions:
1. opening the file 'toto'
2. writing 30000 bytes to the offset 30 into the file toto
3. writing 20000 bytes to the offset 20 into the file toto
4. closing the file "toto".
The resulting CFOR log will be:
* file toto, 20?30030

When dumping, the structural data (metadata) as well as the contents of the modifications are recorded in a separate file.

This separate file is transmitted over to the stand-by node and its process enables to synchronise the tree structure so that it is strictly identical to that of the operational node when dumping.

We shall now describe the synchronisation mechanism implemented in the replication method according to the invention.

When a machine SB appears, its file system (FS) should be synchronised with respect to that of the operational node OP. Such synchronisation must take place Without blocking the operational node OP Consequently, it affects a file system in constant evolution. To avoid the problem of blurred images, the synchronisation takes places via a snapshot of the file system of the operational node OP. The procedure is divided into 2 phases in order to limit the size of the CFOR log.
1. Creation of a snapshot on the operational node OP
2. First synchronisation with the node SB
3. Destruction of the snapshot on the operational node OP
4. Activation of the CFOR log and creation of a second snapshot on the operational node OP
5. Second synchronisation with the node SB (it must be as short as possible)
6. Suppression of the snapshot on the operational node OP, whereas the node SB is ready for receiving a first total dump
7. At the next snapshot, transferring the CFOR log and updating the file system FS of the node SB with the CFOR data
8. The normal dump/restore cycle is in place.

Copying down the memory of a process is made by analysing dynamically the internal memory organisation of the process and by isolating the different zones:
text
data
execution stack The memory is analysed without intrusion into the user code on the basis of the data supplied by the operating system. Such data items are captured and analysed in the very context of the process and enable to create the table of the memory zones used.

Once the analysis completed, the interposition agents of the memory allocation/liberation system calls ensure follow-up of the table of the memory zones.

When dumping, only the memory zones can be modified, i.e. the write-accessible zones are transferred to the stand-by node where they will be copied down. Thus the process on the stand-by node contains the same memory zones with the same data as on the operational node.

As the contents of the memory should be saved atomically from a process viewpoint, it should take place without the process being able to change state, i.e. the process being locked. In order not to lock the process too long, one resorts to the copy-on-write mechanism of the operating system (primitive (fork) for example) to create a copy of the memory image of the process and one transfers this image to the stand-by nodes. Once the transfer completed, the memory image maintained by the copy-on-write mechanisms is suppressed.

The replication method according to the invention also implements an incremental dumping mechanism based upon the memory analysis, but adds moreover a page write-protection mechanism.

Once the pages have been analysed, all the write-accessible pages are protected, i.e. any writing into one of the pages triggers the emission of a page protection violation signal.

The protection is based on the mechanisms supplied by the operating system such as the system call "mprotect".

When the application tries to modify a data item, the page(s) containing such data are marked as modified and de-protected. The operation of the applicative code is not impacted by the adjunction of these (non-intrusive) mechanisms.

When dumping incrementally, only the pages modified since the previous dump are transferred. Once the dump completed, all the pages modified are re-protected in order to detect the next writing sequences. The incremental dump enables to reduce the size of the data items to be transferred to the stand-by unit at each dumping sequence.

Figure 7:
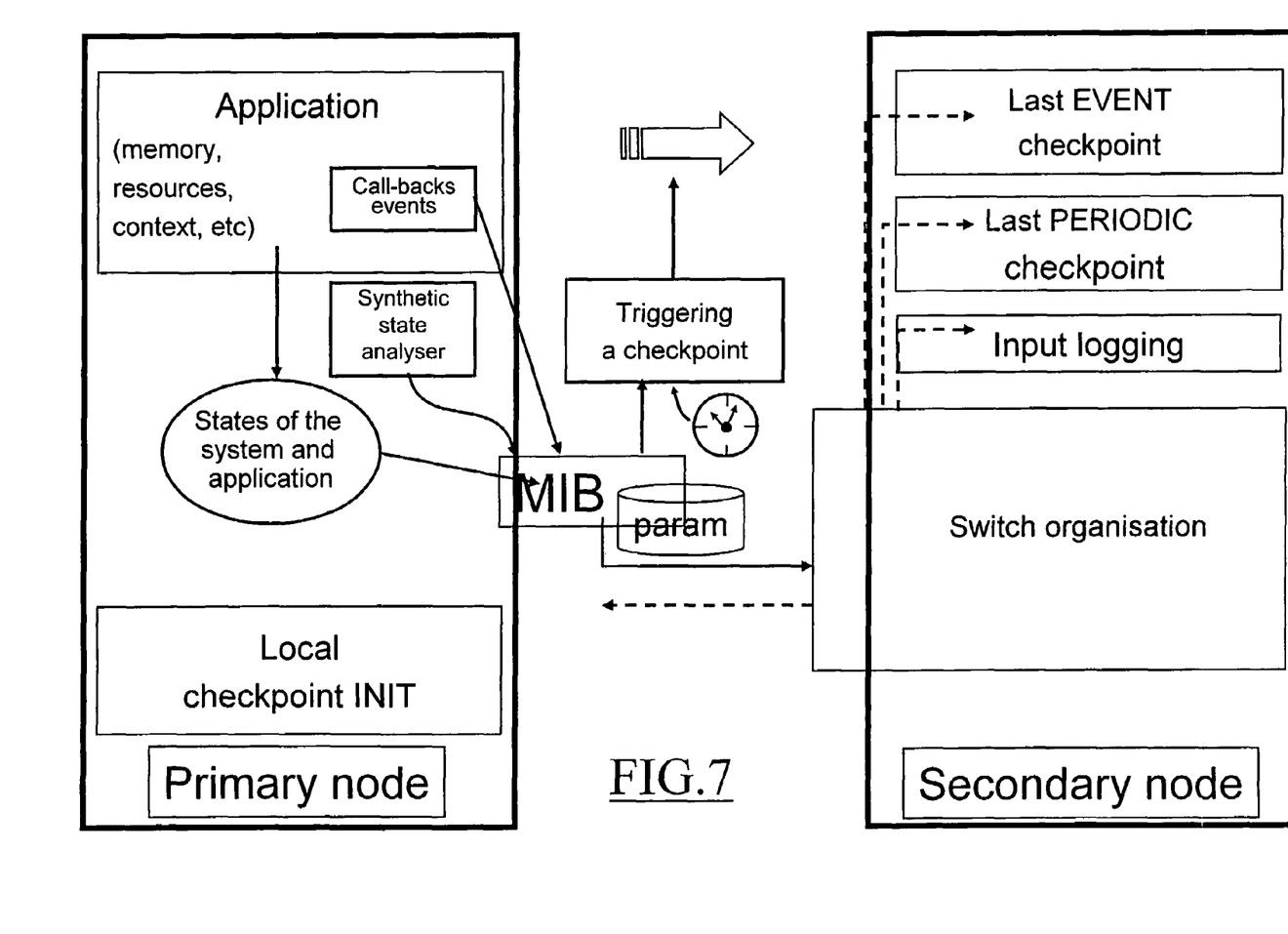
FIG. 7 illustrates diagrammatically the switching mechanism implemented in the replication method according to the invention.

Triggering the checkpoints may be managed from the base MIB which receives, from the primary or operational node, information on the states of the system and of the application, information on the events and call-back on the application as well as information delivered by a synthetic state analyser, as illustrated on FIG. 7. The organisation of the switching of the application from a primary node to a secondary node acts for example on a last checkpoint EVENT, a last checkpoint PERIODIC, an input logging, and may include:
the choice of a switching scenario,
the choice of a checkpoint,
triggering a restoration,
triggering (or not) a log replay,
notifying the new operational node.

Obviously, the invention is not limited to the examples which have just been described and numerous amendments may be made to these examples without departing from the framework of the invention.

The invention claimed is:

1. A computer implemented method for replicating a software application, the computer implemented method comprising:
executing the software application on a primary node to form a master application;
identifying resources and dependencies required by the master application to form required resources;
updating the required resources dynamically on the primary node;
generating a structure of the master application and a dynamic graph of the required resources from the required resources;
replicating the resources by transferring the structure to a set of secondary nodes via a network to form a replica by checkpointing the resources on the set of secondary nodes, wherein the set of secondary nodes comprises one or more secondary nodes, wherein the replicated resources on the set of secondary nodes comprise a virtual memory and calling stack of each process of the master application, at least one system resource used by the master application, and data written on disks used by the master application, wherein the checkpointing has an adjustable period to optimize the difference between the recovery time after switching to the set of secondary nodes and the quantity of information to be captured and transferred to the set of secondary nodes;
restoring the replica on the set of secondary nodes to form a set of clone software applications, wherein the set of clone software applications comprises one or more clone software applications;
executing the set of clone software applications on the set of secondary nodes, without loss of context; and
updating the set of clone software applications with incremental updates of the required resources of the master application to create a hot standby application.

2. The computer implemented method according to claim 1, wherein replicating the resources further comprises:
creating and maintaining a dependency tree, based on the dynamic graph, supplying, at all times, information on the replicated resources.

3. The computer implemented method according to claim 1, wherein replicating the resources further comprises:
capturing the resources on the primary node to create captured required resources;
transferring the captured required resources over the network to the set of secondary nodes; and
restoring the captured required resources on the set of secondary nodes.

4. The computer implemented method according to claim 1, wherein replicating the resources further comprises:
optimizing the checkpointing.

5. The computer implemented method according to claim 4, wherein the checkpointing is incremental.

6. The computer implemented method according to claim 4, wherein the checkpointing is discriminating.

7. The computer implemented method according to claim 1, wherein the checkpointing further comprises at least one of the following:
processing a synchronization barrier for locking the processes of the master application to take a non-blurred photograph of the state of the primary node and the master application at each of a plurality of phases of the checkpointing;
managing resources necessary for replicating the master application during the plurality of phases of the checkpointing;
managing the at least one system resource used by the master application during the plurality of phases of the checkpointing; and
managing process resources.

8. The computer implemented method according to claim 1, wherein replicating the resources further comprises:
replicating applicative data files between the primary node, whereon the software application is run, and a stand-by node.

9. The computer implemented method according to claim 1, wherein replicating the resources further comprises:
ensuring functional continuity of the software application in a multi-computer architecture cluster, the software application being executed at a given time on one of the computers of the cluster, called the primary node, while other computers of the cluster are called a set of secondary nodes, wherein ensuring functional continuity further comprises:
replicating the software application on at least one of the secondary nodes to provide a set of clones of the application, wherein the set of clones comprises one or more clones;
updating the set of clones, and
responsive to detecting an event affecting the primary node, switching from the software application being executed on the primary node, to the software application being executed on the set of clones.

10. The computer implemented method according to claim 9, wherein replicating the software application is of a holistic nature.

11. The computer implemented method according to claim 9, wherein updating the set of clones further comprises updating the set of clones of the application.

12. The computer implemented method according to claim 9, wherein ensuring functional continuity further comprises supervising a state of the resources necessary to operate the software application.

13. The computer implemented method according to claim 9, wherein detecting an event affecting the primary node further comprises:
responsive to detecting an event affecting the primary node, electing a clone to be substituted for the primary node of the software application, wherein the secondary node on which the clone elect is installed becomes a new primary node.

14. The computer implemented method according to claim 13, wherein replicating the resources further comprises:
recording, on the set of clones, messages received by the primary node, the messages being injected into the clone elected as the new primary node when switching.

15. The computer implemented method according to claim 1, wherein replicating the resources further comprises:
optimization of information processing resources by load sharing and dynamic process distribution.

16. The computer implemented method according to claim 1, wherein replicating the resources further comprises:
performing non-interruptive maintenance by process relocation upon request, over a data-processing resource network.

17. The computer implemented method according to claim 1, wherein replicating the resources further comprises:
preserving applicative context in a mobile application.

18. A multi-computer system for ensuring functional continuity, capable of running, on at least one computer, at least one software application, the multi-computer system comprising:
a memory comprising a set of instructions;
a processor connected to the memory, capable of executing the set of instructions to implement a method comprising:
ensuring functional continuity of the software application in a multi-computer architecture cluster, the software application being executed at a given time on one of the computers of the cluster, called a primary node, to form a master application, while other computers of the cluster are called a set of secondary nodes, wherein ensuring functional continuity further comprises:
identifying resources and dependencies required by the master application to form required resources;
updating the required resources dynamically on the primary node;
generating a structure of the master application and a dynamic graph of the required resources from the required resources;
replicating the resources by transferring the structure to a set of secondary nodes via a network to form a replica by checkpointing the resources on the set of secondary nodes, wherein the set of secondary nodes comprises one or more secondary nodes, wherein the replicated resources on the set of secondary nodes comprise a virtual memory and calling stack of each process of the master application, at least one system resource used by the master application, and data written on disks used by the master application, wherein the checkpointing has an adjustable period to optimize the difference between the recovery time after switching to the set of secondary nodes and the quantity of information to be captured and transferred to the set of secondary nodes;
restoring the replica on the set of secondary nodes to form a set of clone software applications, wherein the set of clone software applications comprises one or more clone software applications;
executing the set of clone software applications on the set of secondary nodes, without loss of context; and
updating the set of clone software applications with incremental updates of the required resources of the master application to create a hot standby application.

* * * * *